US009101440B2

(12) United States Patent
Jubinville

(10) Patent No.: US 9,101,440 B2
(45) Date of Patent: Aug. 11, 2015

(54) ANIMAL SQUEEZE WITH ADJUSTABLE CRADLE

(76) Inventor: Leonard Jubinville, Sturgeon County (CA)

( * ) Notice: Subject to any disclaimer, the term of this patent is extended or adjusted under 35 U.S.C. 154(b) by 0 days.

(21) Appl. No.: 13/544,836

(22) Filed: Jul. 9, 2012

(65) Prior Publication Data

US 2013/0174796 A1 Jul. 11, 2013

Related U.S. Application Data

(60) Provisional application No. 61/505,629, filed on Jul. 8, 2011.

(51) Int. Cl.
*A01K 15/04* (2006.01)
*A61D 3/00* (2006.01)

(52) U.S. Cl.
CPC .................................... *A61D 3/00* (2013.01)

(58) Field of Classification Search
CPC ............................ A01K 15/04; A01K 1/0613
USPC ......... 119/723, 722, 724, 753, 754, 756, 751, 119/752
See application file for complete search history.

(56) References Cited

U.S. PATENT DOCUMENTS

| | | | | | |
|---|---|---|---|---|---|
| 4,055,148 | A | * | 10/1977 | Brockman et al. | 119/723 |
| 4,084,544 | A | * | 4/1978 | Wehmeyer | 119/723 |
| 4,312,300 | A | * | 1/1982 | Hopkins | 119/723 |
| 4,340,012 | A | * | 7/1982 | Gustafson | 119/723 |
| 5,282,441 | A | * | 2/1994 | Ricketts | 119/724 |
| 5,441,016 | A | * | 8/1995 | Ricketts | 119/723 |
| 5,738,045 | A | * | 4/1998 | Bleacher | 119/751 |
| 6,199,514 | B1 | * | 3/2001 | Jubinville et al. | 119/728 |

* cited by examiner

*Primary Examiner* — Timothy D Collins
*Assistant Examiner* — Jessica Wong
(74) *Attorney, Agent, or Firm* — Christensen O'Connor Johnson Kindness PLLC

(57) ABSTRACT

There is provided an animal squeeze having a drop floor and a cradle in which an animal is suspended. A mechanism for altering the positioning of the cradle relative to the drop floor is described. The cradle can be raised or lowered to accommodate animals of differing size. The cradle can also be tilted horizontally to improve access to portions of the animal.

11 Claims, 9 Drawing Sheets

ANIMAL SQUEEZE WITH ADJUSTABLE CRADLE

FIELD

There is described an animal squeeze used to assist in treating animals. The animal squeeze may be used to treat deer and other animals.

BACKGROUND

U.S. Pat. No. 6,199,514, issued to Jubinville, entitled "Method of restraining an animal within an animal squeeze and an animal squeeze," discloses an apparatus which was developed for handling deer but is capable of handling other animals.

SUMMARY

There is provided an animal squeeze having a drop floor and a cradle in which an animal is suspended. The animal squeeze has a mechanism for altering the positioning of the cradle relative to the drop floor.

A problem that may be encountered with animal squeezes is dealing with animals of differing size. Animals of different species differ in size. Even within the same species, animals vary widely in size. This problem may be addressed by altering the positioning of the cradle relative to the drop floor. The mechanism raises or lowers the cradle relative to the drop floor, to accommodate different species and sizes of animals.

Another problem that may be encountered is in servicing the hooves of the animal in the squeeze. This problem may be addressed by altering the positioning of the cradle relative to the drop floor. The mechanism tilts the cradle from a substantially vertical orientation used to capture the animal to a substantially horizontal orientation when necessary to care for the animal.

A further problem that may be encountered is in accessing parts of the animal that are inaccessible due to the cradle. This may be addressed by providing one side of the cradle with a built-in table capable of supporting the animal and a mechanism for moving an opposed side of the cradle to expose the table when the cradle is in the horizontal orientation.

When the cradle is placed in the horizontal orientation, there may be a table extension to enlarge a surface area of the table to better support the animal.

The mechanism to move the opposed side of the cradle and the mechanism to move the cradle itself may be based upon different technologies. Beneficial results have been obtained using fluid driven telescopically extendible actuators, typically hydraulic or air. The movement can also be accomplished with motor-driven screws or motor-driven gears.

BRIEF DESCRIPTION OF THE DRAWINGS

These and other features will become more apparent from the following description in which reference is made to the appended drawings, which are for the purpose of illustration only and are not intended to be in any way limiting, wherein.

DETAILED DESCRIPTION

Figure 1:
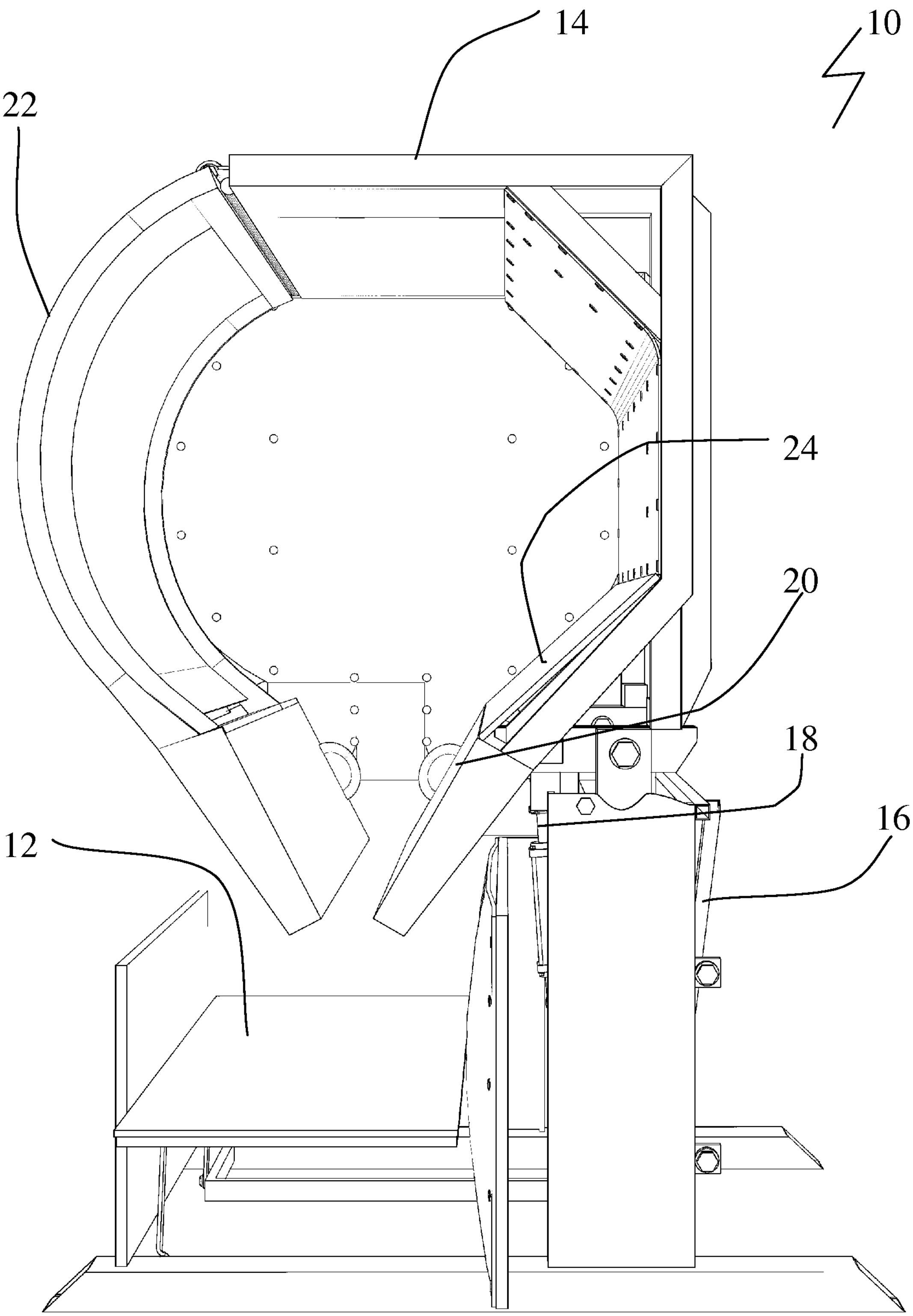
FIG. 1 is an end elevation view of an open end of the animal squeeze with the cradle in a vertical orientation and the drop floor raised.

An animal squeeze generally identified by reference numeral 10, will now be described with reference to FIG. 1 through FIG. 10.

Figure 2:
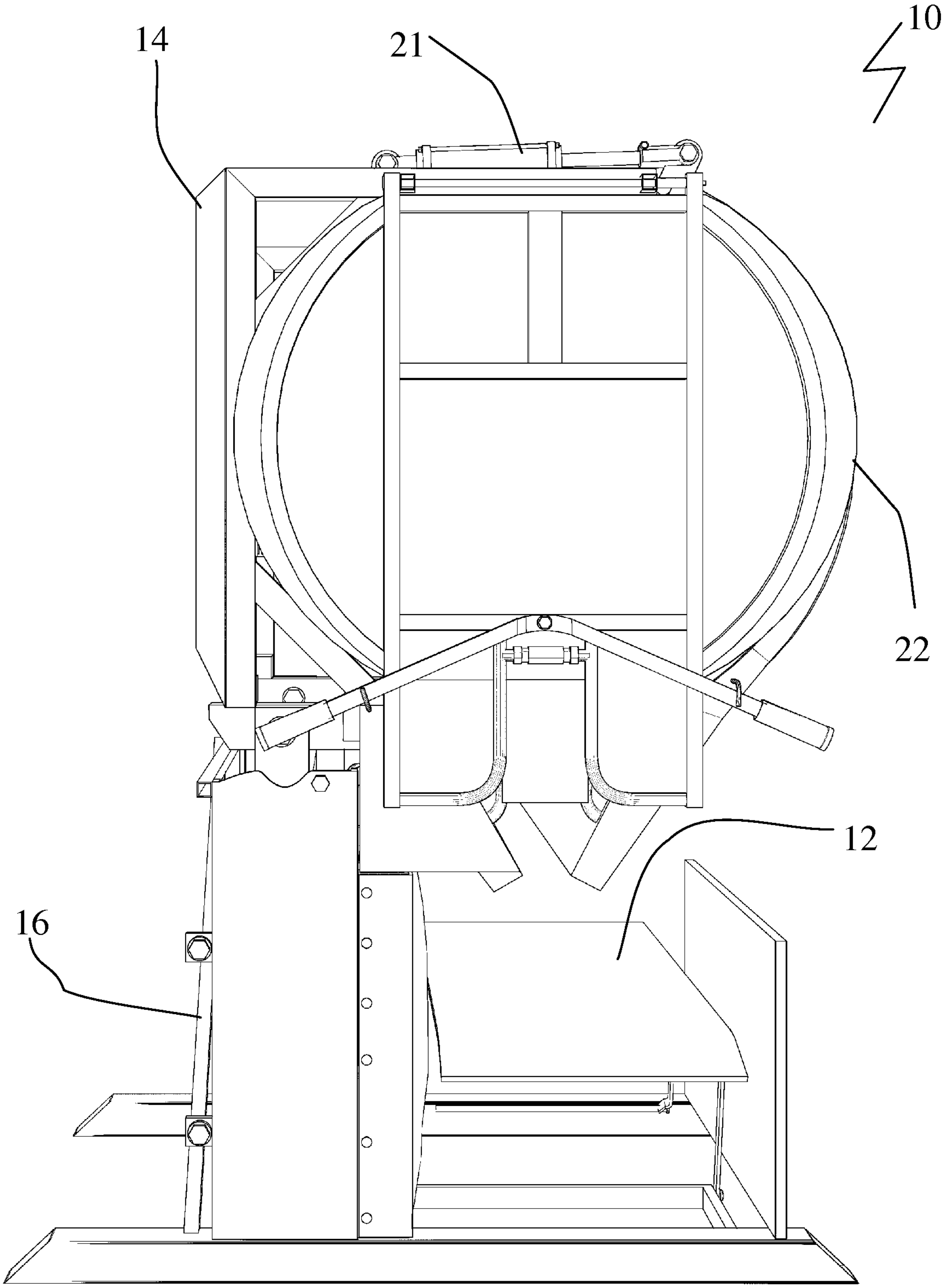
FIG. 2 is an end elevation view of a closed end of the animal squeeze with the cradle in a vertical orientation and the drop floor raised.
Figure 3:
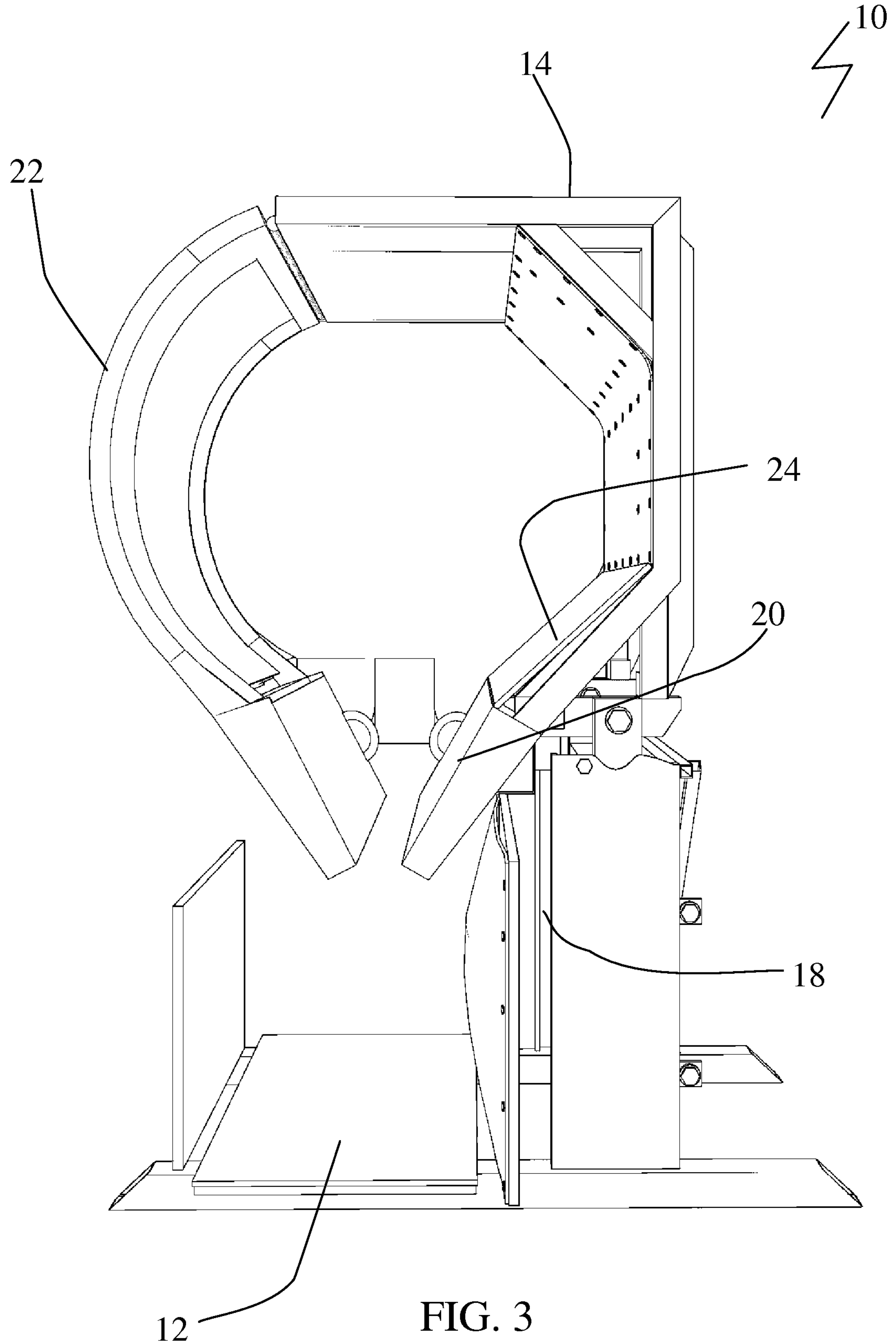
FIG. 3 is an end elevation view of the open end of the animal squeeze with the cradle in a vertical orientation and the drop floor lowered.

Structure and Relationship of Parts:

Referring to FIG. 1 through FIG. 3, animal squeeze 10 has a drop floor 12 and a cradle 14 in which an animal (not shown) is suspended. A mechanism in the form of one or more telescopically extendible hydraulic cylinders 16 (shown in FIG. 9) is provided to raise or lower cradle 14 relative to drop floor 12. As will hereinafter be described, this is done to accommodate different species and sizes of animals.

Figure 4:
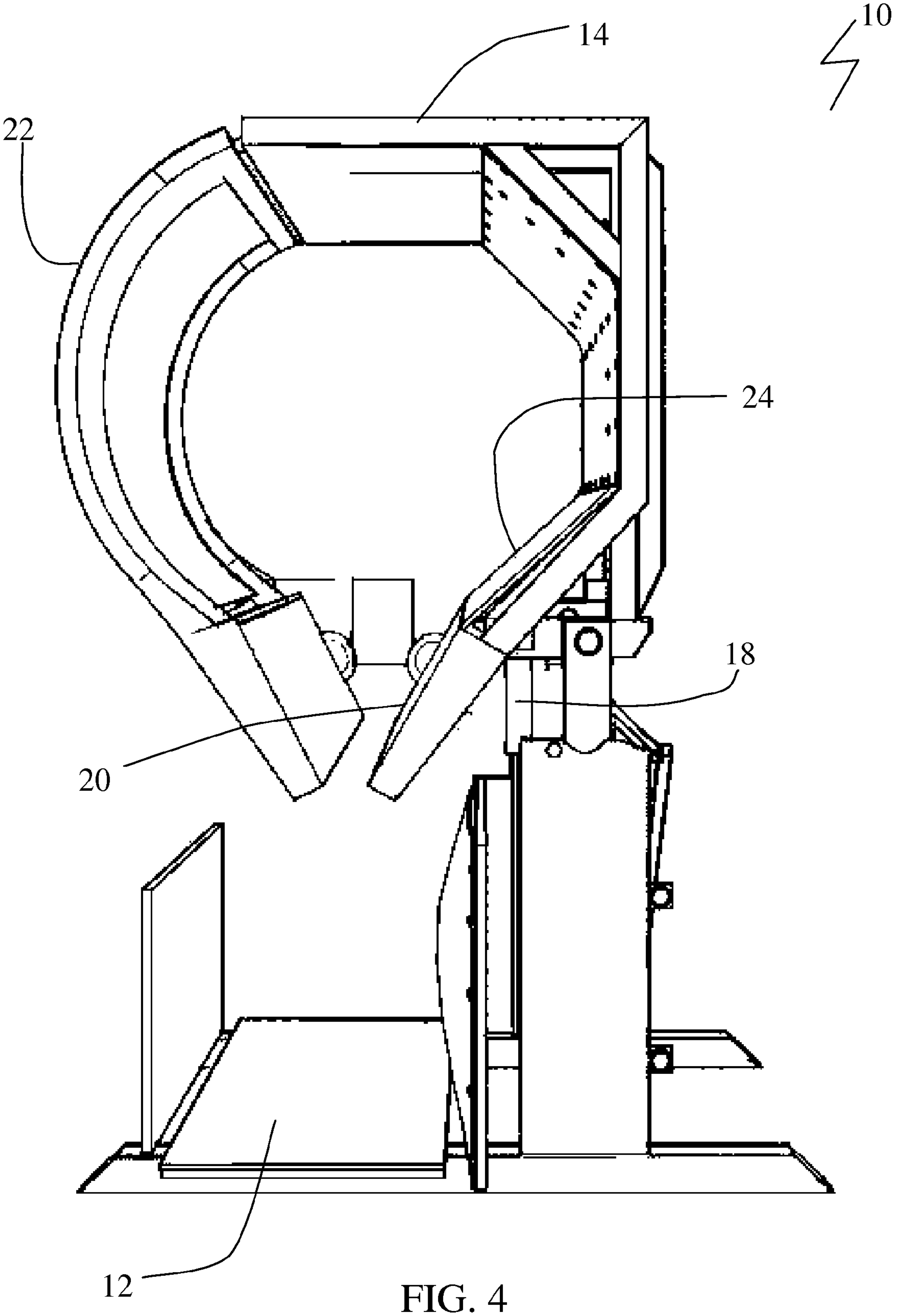
FIG. 4 is an end elevation view of the open end of the animal squeeze with the cradle in a vertical and raised orientation and the drop floor lowered.
Figure 5:
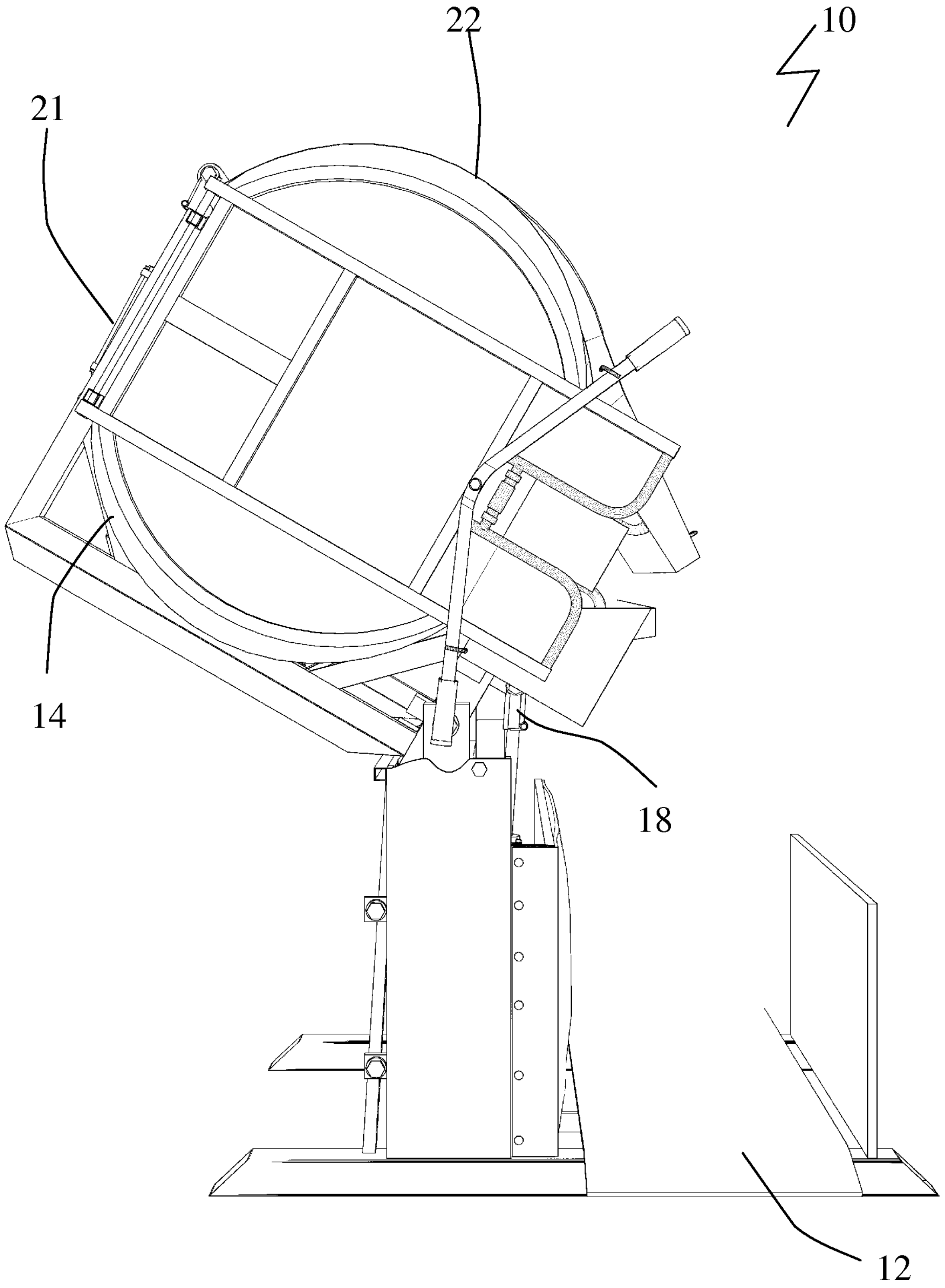
FIG. 5 is an end elevation view of the closed end of the animal squeeze with the cradle in a raised and tilted orientation.

Referring to FIG. 4, another mechanism, also in the form of one or more telescopically extendible hydraulic cylinders 18, tilts cradle 14 from a substantially vertical orientation used to capture an animal as previously shown in FIG. 1 through FIG. 3, to a substantially horizontal orientation shown in FIG. 5, when necessary to care for the animal.

Figure 9:
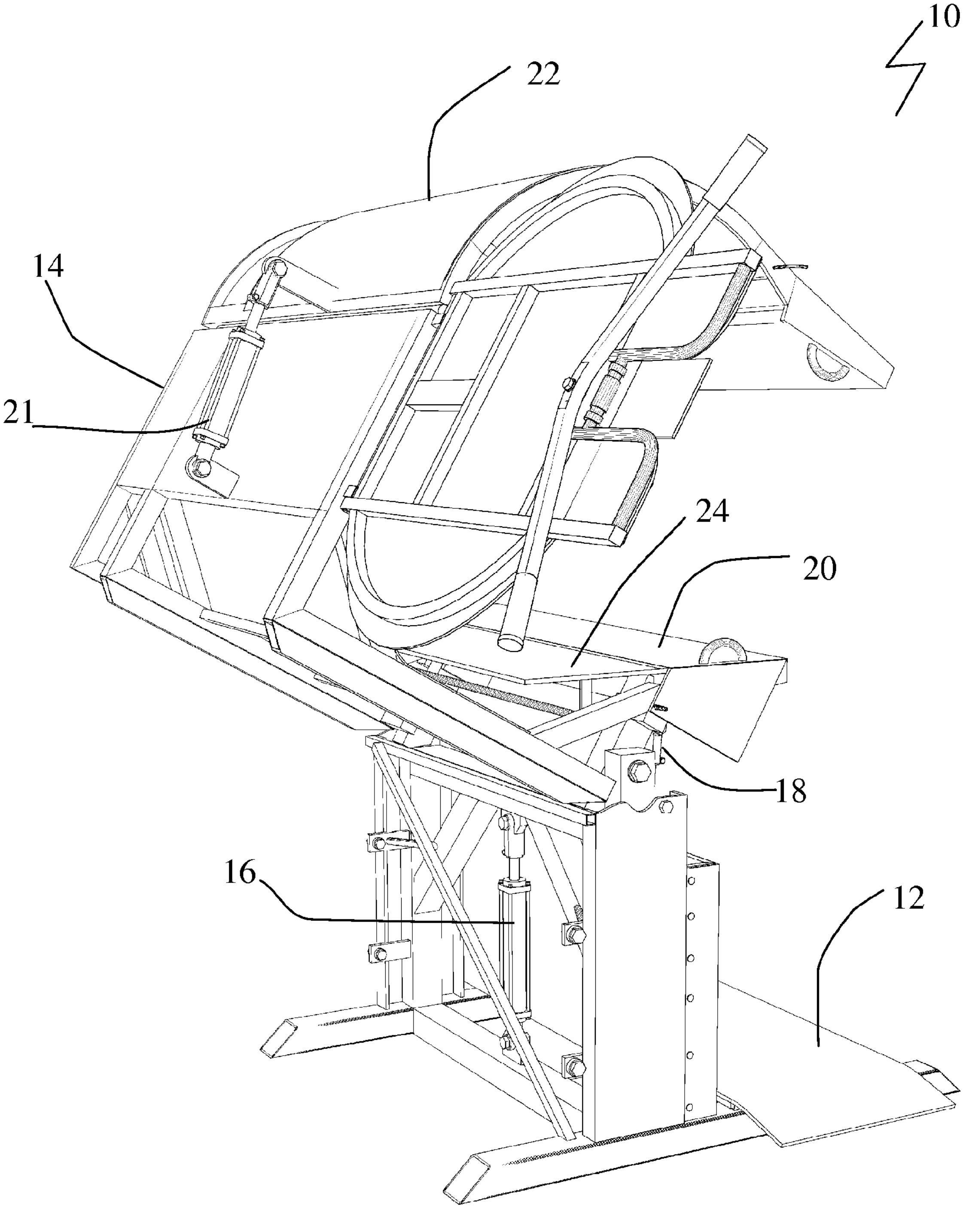
FIG. 9 is a perspective view of the animal squeeze with the cradle placed in a substantially horizontal orientation and the opposed side of the cradle moved out of the way to expose the built-in table.
Figure 10:
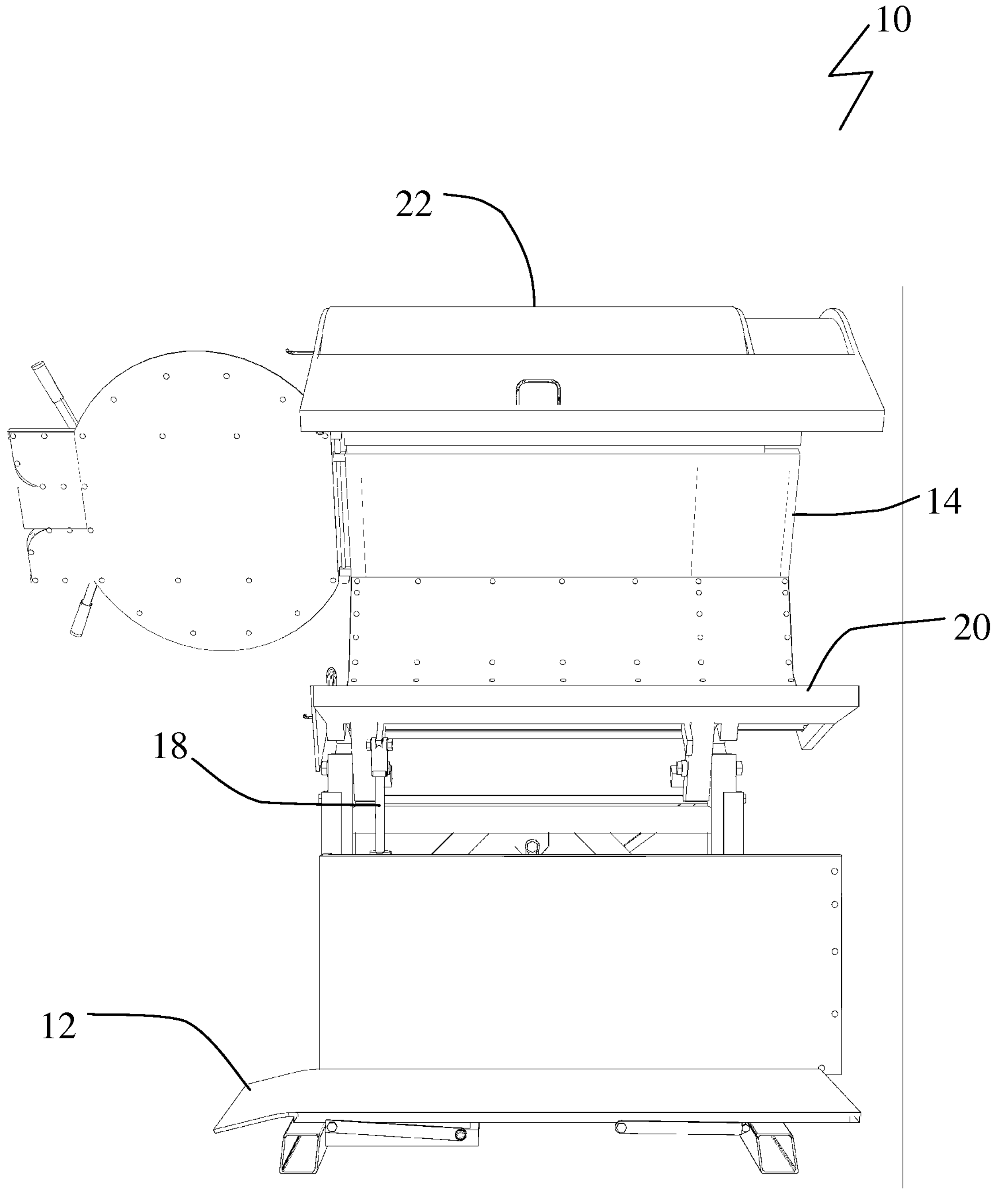
FIG. 10 is a side elevation view of the animal squeeze with the cradle placed in a substantially horizontal orientation and the opposed side of the cradle moved out of the way to expose the built-in table.

Referring to FIG. 9 and FIG. 10, should problems be encountered in accessing parts of the animal that are inaccessible due to cradle 14, the animal can be sedated and portions of cradle 14 removed. When sedating the animal, it is preferred that drugs be avoided, although they may be used. A facemask can be used to administer a gas that will render the animal unconscious. When the facemask is removed, the animal will recover in less than a minute and, unlike drugs, there will be no residue left in the animal's blood stream. Cradle 14 has a built-in table 20 capable of supporting the animal and a mechanism, also in the form of one or more telescopically extendible hydraulic cylinders 21, is provided for opening cradle 14 by moving opposed side 22 of cradle 14 to expose table 20 when cradle 14 is in the horizontal orientation. Springs or other devices (not shown) may be included to act as a counterweight for opening and closing cradle 14. It will be appreciated that opposed side 22 is useful in restraining the animal until sufficiently sedated. It will also be appreciated that table 20 may be raised and lowered using the same mechanism that raises and lowers cradle 14.

Figure 7:
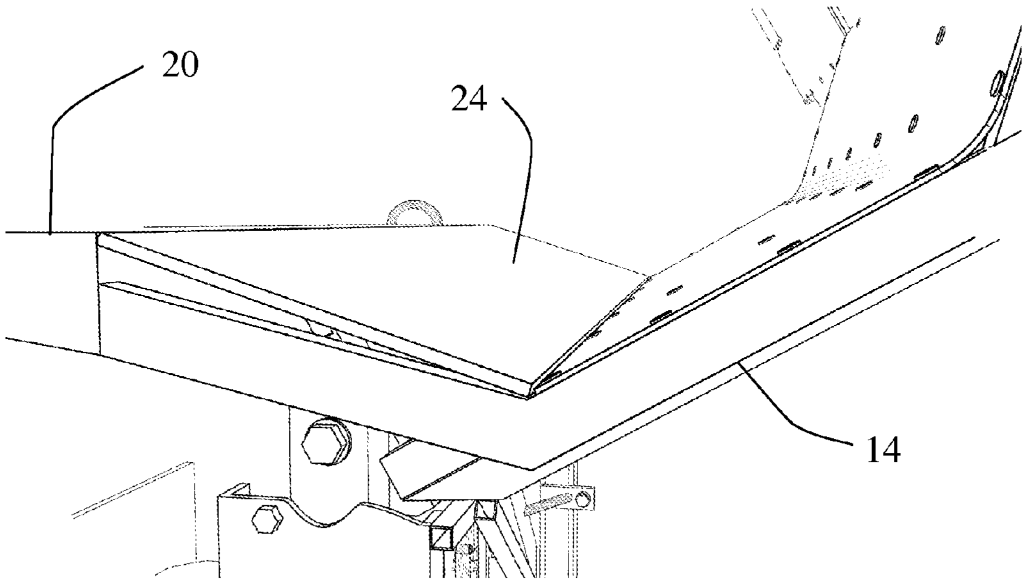
FIG. 7 is a detailed perspective view of the built-in table in the cradle of the animal squeeze.
Figure 8:
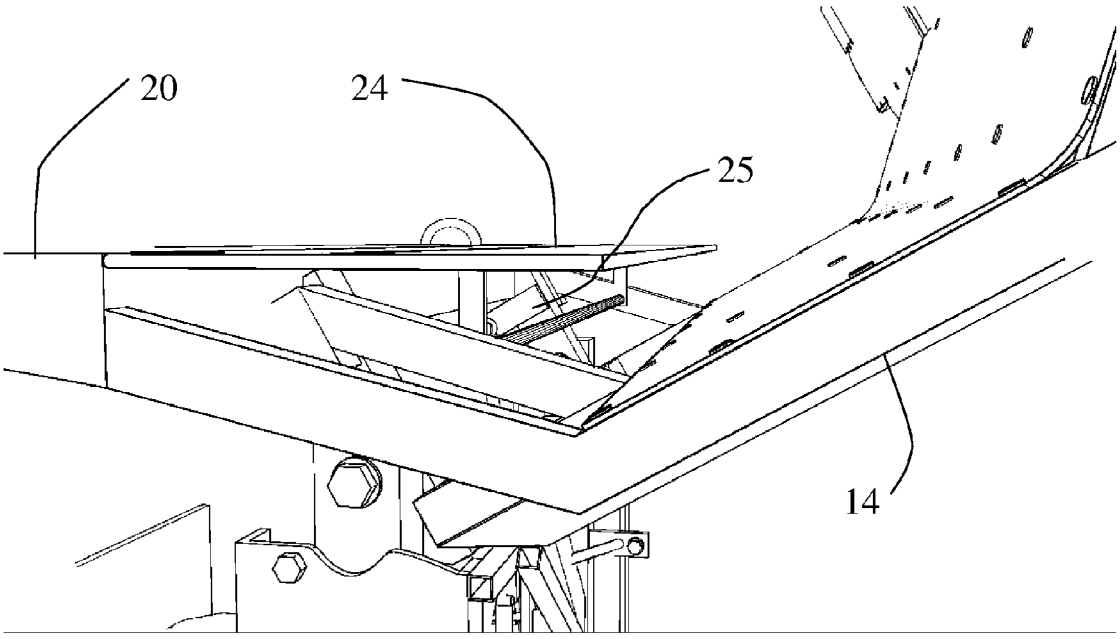
FIG. 8 is a detailed perspective view of the built-in table in the cradle with a table extension raised to better support an animal.

Referring to FIG. 7 and FIG. 8 a table extension 24 is provided to enlarge a surface area of table 20. Table extension 24, which is preferably retracted out of the way when cradle 14 was in the vertical orientation, can be moved to support the animal when cradle 14 is in the horizontal position. The position of table extension 24 is controlled by a hydraulic cylinder 25.

It will be understood that, while hydraulic cylinders are shown as actuating the various components of animal squeeze 10, these may be repositioned or replaced with any known actuation method, such as electric motors, mechanical gears, may be driven manually or by a power source, etc.

Figure 6:
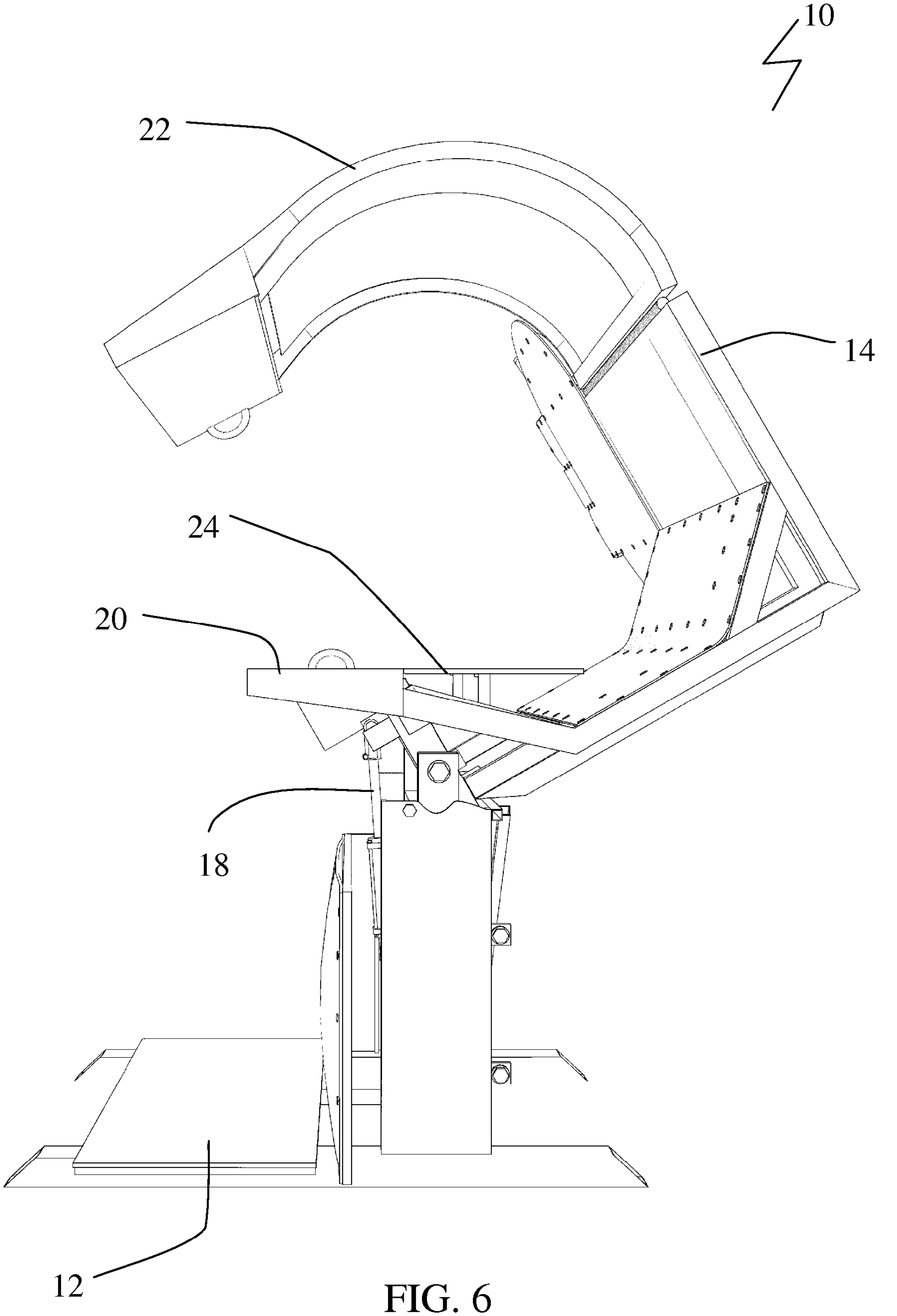
FIG. 6 is an end elevation view of the open end of the animal squeeze with the cradle placed in a substantially horizontal orientation and the opposed side of the cradle moved out of the way to expose the built-in table with a table extension raised to better support an animal.

Operation:

A typical use sequence will now be described with reference to FIG. 1 through FIG. 8. Referring to FIG. 1 and FIG. 2, telescopically extendible hydraulic cylinders 16 are used to raise or lower cradle 14 relative to drop floor 12 to accommodate the size of the animal to be restrained. Referring to FIG. 3, the animal enters animal squeeze 10 and, when in a desired position, drop floor 12 is dropped. This results in the animal being suspended above drop floor 12 in cradle 14. Referring to FIG. 5, hydraulic cylinders 18 are used to tilt cradle 14 from a substantially vertical orientation used to capture the animal previously shown in FIG. 1 and FIG. 2, to a substantially horizontal orientation shown in FIG. 5, when necessary to care for the animal. Referring to FIG. 6, should problems be encountered in accessing parts of the animal that are inaccessible due to cradle 14, the animal can be sedated and portions of cradle 14 removed. Hydraulic cylinders 21 are used to move opposed side 22 of cradle 14 to expose table 20. Referring to FIG. 7 and FIG. 8, table extension 24 is deployed to enlarge the surface area of table 20 to better support an animal. Referring to FIG. 8, the mechanism for moving table extension 24 is illustrated. Table 20 is raised or lowered to a comfortable working height for the user (e.g., a rancher). When work on the animal is completed, the operation is reversed. Referring to FIG. 7 and FIG. 8, table extension 24 is placed back into its stored position in preparation for changing the orientation of cradle 14. Referring to FIG. 5, hydraulic cylinders 21 are used to return opposed side 22 of cradle 14 to restrain the animal within cradle 14. Hydraulic cylinders 18 are used to tilt cradle 14 from the horizontal orientation shown in FIG. 5 back to vertical orientation shown in FIG. 1 through FIG. 4. Upon recovery of the animal from sedation, which takes less than a minute when gas is used, the animal is released from animal squeeze 10.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the embodiments set forth in the examples, but should be given the broadest interpretation consistent with the description as a whole.

What is claimed is:

1. An animal squeeze, comprising: a support frame; a drop floor; a cradle coupled to the support frame in which the animal can be suspended, the cradle comprising a vertically supporting surface, wherein at least a portion of the vertically supporting surface is angled relative to a vertical axis, such that in operation, the vertically supporting surface suspends and bears weight of the animal; a first mechanism for altering a vertical position of the vertically supporting surface relative to the support frame, the cradle having an orientation relative to the drop floor that remains unchanged as the vertical position is altered, wherein in operation the animal is suspended at the vertical position of the vertically supporting surface; and a second mechanism for moving the drop floor independently of the cradle relative to the support frame.

2. The animal squeeze of claim 1, wherein at least one of the first and second mechanism is at least one fluid-driven, telescopically extendible actuator.

3. The animal squeeze of claim 1, wherein the animal squeeze comprises a third mechanism for altering the orientation of the cradle about an axis of rotation relative to the drop floor in order to change the orientation from a substantially vertical orientation used to capture the animal to a substantially horizontal orientation enclosing the majority of the body of the animal when necessary to care for the animal.

4. The animal squeeze of claim 3, wherein the animal squeeze comprises a fourth mechanism, where one side of the cradle has a built-in table and the fourth mechanism is provided for moving an opposed side of the cradle to expose the table when the cradle is in the substantially horizontal orientation.

5. The animal squeeze of claim 4, wherein the fourth mechanism comprises at least one fluid-driven, telescopically extendible actuator.

6. The animal squeeze of claim 4, wherein the cradle has a table extension that is moved out of the way when the cradle is in the substantially vertical orientation and can be moved to enlarge a surface area of the table supporting the animal when the cradle is in the substantially horizontal orientation.

7. An animal squeeze, comprising: a support frame; a drop floor; a cradle coupled to the support frame in which an animal can be suspended; a first mechanism for altering a vertical position of the cradle relative to the support frame, the cradle having an orientation relative to the drop floor that remains unchanged as the vertical position is altered; a second mechanism for moving the drop floor independently of the cradle relative to the support frame; and a third mechanism for altering the orientation of the cradle about an axis of rotation relative to the drop floor in order to change the orientation from a substantially vertical orientation used to capture the animal to a substantially horizontal orientation enclosing the majority of the body of the animal when necessary to care for the animal.

8. The animal squeeze of claim 7, wherein the animal squeeze comprises a fourth mechanism, where one side of the cradle has a built-in table and the fourth mechanism is provided for moving an opposed side of the cradle to expose the table when the cradle is in the substantially horizontal orientation.

9. The animal squeeze of claim 8, wherein the fourth mechanism comprises at least one fluid-driven, telescopically extendible actuator.

10. The animal squeeze of claim 8, wherein the cradle has a table extension that is moved out of the way when the cradle is in the substantially vertical orientation and is moveable to enlarge a surface area of the table supporting the animal when the cradle is in the substantially horizontal orientation.

11. An animal squeeze, comprising:

a support frame;

a drop floor; and a cradle coupled to the support frame in which an animal is suspended, the cradle having a downward facing C-shape that receives a body of the animal;

a first mechanism for altering a vertical position of the cradle relative to the support frame, the cradle having an orientation relative to the drop floor that remains unchanged as the vertical position is altered; and a second mechanism for moving the drop floor independently of the cradle relative to the support frame, the cradle supporting the body of the animal in a vertical orientation when the drop floor is lowered.

* * * * *